United States Patent
Chapman et al.

(10) Patent No.: US 9,556,769 B2
(45) Date of Patent: *Jan. 31, 2017

(54) HONEYCOMB STRUCTURE COMPRISING AN OUTER CEMENT SKIN AND A CEMENT THEREFOR

(71) Applicant: Corning Incorporated, Corning, NY (US)

(72) Inventors: Thomas Richard Chapman, Painted Post, NY (US); Linda Jane Ingersoll, Wilmington, NC (US); Patrick David Tepesch, Corning, NY (US)

(73) Assignee: CORNING INCORPORATED, Corning, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/818,780

(22) Filed: Aug. 5, 2015

(65) Prior Publication Data

US 2015/0337701 A1   Nov. 26, 2015

Related U.S. Application Data

(62) Division of application No. 14/638,251, filed on Mar. 4, 2015, which is a division of application No. (Continued)

(51) Int. Cl.
*B01D 46/24* (2006.01)
*C04B 38/00* (2006.01)
(Continued)

(52) U.S. Cl.
CPC ......... *F01N 3/0222* (2013.01); *B01D 46/0001* (2013.01); *B01D 46/2429* (2013.01);
(Continued)

(58) Field of Classification Search
None
See application file for complete search history.

(56) References Cited

U.S. PATENT DOCUMENTS

| 5,360,773 A | 11/1994 | Winkelbauer et al. |
| 7,435,279 B2 | 10/2008 | Masukawa et al. |
| (Continued) |

FOREIGN PATENT DOCUMENTS

| EP | 1837077 A2 | 9/2007 |
| EP | 2186562 A1 | 5/2010 |

OTHER PUBLICATIONS

Wang et al.; "The Effect of Cristobalite Seed on the Crystallization of Fused Silica Based Ceramic Core—A Kinetic Study"; Ceramics International 21 (1995); pp. 187-193.

*Primary Examiner* — David Sample
*Assistant Examiner* — Nicholas W Jordan
(74) *Attorney, Agent, or Firm* — Kevin M. Able

(57) ABSTRACT

A honeycomb catalyst support structure including a honeycomb body and an outer layer or skin formed of a cement is described. The cement includes an amorphous glass powder with a multimodal particle size distribution applied to an exterior surface of the honeycomb body. The multimodal particle size distribution is achieved through the use of a first glass powder having a first median particle size and at least a second glass powder having a second median particle size. In some embodiments, the first and second glass powders are the same amorphous glass consisting of fused silica. The cement may further include a fine-grained, sub-micron sized silica in the form of colloidal silica. The cement exhibits a coefficient of thermal expansion less than $15 \times 10^{-7}/°C$., and preferably about $5 \times 10^{-7}/°C$. after drying.

12 Claims, 4 Drawing Sheets

Related U.S. Application Data

13/302,262, filed on Nov. 22, 2011, now Pat. No. 8,999,483.

(60) Provisional application No. 61/417,616, filed on Nov. 29, 2010.

(51) Int. Cl.

| | | |
|---|---|---|
| *F01N 3/022* | (2006.01) | |
| *B01J 35/04* | (2006.01) | |
| *B01J 21/08* | (2006.01) | |
| *B01J 37/02* | (2006.01) | |
| *B01J 37/08* | (2006.01) | |
| *B01D 46/00* | (2006.01) | |
| *C04B 41/00* | (2006.01) | |
| *C04B 41/50* | (2006.01) | |
| *C04B 41/86* | (2006.01) | |
| *C04B 14/00* | (2006.01) | |
| *C04B 103/00* | (2006.01) | |
| *C04B 111/00* | (2006.01) | |

(52) U.S. Cl.
CPC .......... *B01D 46/2444* (2013.01); *B01J 21/08* (2013.01); *B01J 35/04* (2013.01); *B01J 37/0215* (2013.01); *B01J 37/08* (2013.01); *C04B 14/00* (2013.01); *C04B 38/0006* (2013.01); *C04B 41/009* (2013.01); *C04B 41/5022* (2013.01); *C04B 41/86* (2013.01); *B01D 2046/2433* (2013.01); *C04B 2103/0024* (2013.01); *C04B 2111/00793* (2013.01); *C04B 2235/5427* (2013.01); *C04B 2235/5436* (2013.01); *C04B 2235/5463* (2013.01); *F01N 2330/06* (2013.01); *Y10T 428/24149* (2015.01)

(56) References Cited

U.S. PATENT DOCUMENTS

| | | | |
|---|---|---|---|
| 7,560,154 | B2 | 7/2009 | Katoh |
| 7,585,569 | B2 | 9/2009 | Carre et al. |
| 7,883,759 | B2 | 2/2011 | Takahashi |
| 7,976,769 | B2 | 7/2011 | Fletcher et al. |
| 8,039,086 | B2 | 10/2011 | Tomita et al. |
| 8,143,180 | B2 | 3/2012 | Earl et al. |
| 8,182,603 | B2 | 5/2012 | Cecce et al. |
| 8,242,038 | B2 | 8/2012 | Earl et al. |
| 8,277,895 | B2 | 10/2012 | Kono et al. |
| 8,500,840 | B2 | 8/2013 | Okazaki et al. |
| 8,518,857 | B2 | 8/2013 | Bliss et al. |
| 8,617,659 | B2 | 12/2013 | Domey et al. |
| 8,691,361 | B2 | 4/2014 | Okazaki et al. |
| 8,728,607 | B2 | 5/2014 | Okazaki et al. |
| 9,089,992 | B2 | 7/2015 | Domey et al. |
| 2006/0105139 | A1* | 5/2006 | Suwabe ............ B01D 46/2429 428/116 |
| 2008/0124504 | A1 | 5/2008 | Faber et al. |
| 2009/0142499 | A1 | 6/2009 | Cecce et al. |
| 2009/0239030 | A1* | 9/2009 | Cai ................... C04B 38/0019 428/116 |
| 2009/0286041 | A1 | 11/2009 | Deneka et al. |
| 2010/0252497 | A1 | 10/2010 | Ellison et al. |

* cited by examiner

HONEYCOMB STRUCTURE COMPRISING AN OUTER CEMENT SKIN AND A CEMENT THEREFOR

CROSS-REFERENCE TO RELATED APPLICATIONS

This application is a divisional of U.S. patent application Ser. No. 14/638,251 filed on Mar. 4, 2015, which is a divisional of U.S. patent application Ser. No. 13/302,262 filed on Nov. 22, 2011 and claims the benefit of priority under 35 U.S.C. §119 of U.S. Provisional Application Ser. No. 61/417,616 filed on Nov. 29, 2010, the contents of which are incorporated herein by reference.

BACKGROUND

Field of the Invention

The present invention relates generally to honeycomb structures, and particularly to ceramic honeycomb particulate filters and substrates comprising an outer skin layer exhibiting improved thermal expansion compatibility with the underlying honeycomb body.

Technical Background

Much interest has been directed towards the diesel engine due to its efficiency, durability and economical aspects. However, diesel emissions have come under attack both in the United States and Europe for their harmful effects on the environment and on humans. As such, stricter environmental regulations will require diesel engines to be held to the same standards as gasoline engines. Therefore, diesel engine manufacturers and emission-control companies are working to achieve a faster, cleaner diesel engine that meets the most stringent of requirements under all operating conditions with minimal cost to the consumer.

Diesel particulate filters and substrates with large diameters cannot currently be manufactured to the tight dimensional requirements set by original equipment manufacturers (OEMs) and the supply chain due to unpredictable drying and firing shrinkage. Consequently, a coldset ceramic cement has been used to form the exterior skin of the cordierite monolith. The coldset ceramic cement is mixed and applied to a fired, contoured substrate and the wet skin is afterward allowed to dry either under ambient conditions or by convective or microwave drying at elevated temperatures. The dried part is then ready to receive a catalyst coating and any further downstream processing required.

Present skin designs embody conflicting physical property requirements between the final application and the intermediate processing and handling. In service, the material must have a low thermal expansion and high thermal shock resistance (low elastic modulus) to endure severe thermal gradients. To achieve these properties, high porosity and weak bonding are desired for maximum skin flexibility. To withstand shipping, handling and/or processing (including extreme pH exposure during catalyzation), high strength and chip/abrasion resistance are desired. To achieve these properties, low porosity and strong bonding between the skin and the ceramic body are sought for maximum skin strength.

Previous attempts to achieve a balance between the above properties have focused on ground cordierite as a filler material in the skin to enable low coefficient of thermal expansion (CTE). However, even though ground cordierite is capable of producing a skin having reduced CTE, the resultant CTE is insufficiently low to enable the most extreme oven thermal processing conditions of rapid heating and cooling cycles.

SUMMARY

In one embodiment, a honeycomb structure is disclosed comprising a honeycomb body including a plurality of cells extending axially between first and second opposing end faces of the honeycomb body, the cells comprising intersecting porous walls, a cement mixture deposited over a periphery of the honeycomb body, the cement mixture comprising a first glass powder filler material having a first particle size distribution with a D50 in a range from about 10 μm to about 50 μm and a second glass powder filler material having a second particle size distribution with a D50 in a range from about 150 to about 300 μm and wherein the first and second glass powders are amorphous fused silica. The cement mixture may be a green cement mixture in that the cement mixture may be dried but not calcined, or the cement mixture may be a calcined cement mixture. An average coefficient of thermal expansion of the cement mixture from 600° C. on cooling to room temperature is equal to or less than about $15 \times 10^{-7}/°$ C., preferably equal to or less than about $10 \times 10^{-7}/°$ C.

In some embodiments the cement mixture is a calcined cement mixture and a coefficient of thermal expansion of the cement mixture is substantially equal to a thermal expansion coefficient of the honeycomb body. The cement mixture may further comprise cordierite or mullite. The cement mixture may further also comprise colloidal silica particles wherein a maximum particle size of the colloidal silica particles is less than 1 μm.

A first particle size distribution of the first glass powder filler material preferably has a D10 in a range from about 1 μm to about 10 μm and a D90 in a range from about 25 μm to about 125 μm. A second particle size distribution of the second glass powder filler material preferably has a D10 in a range from about 100 μm to about 150 μm, and a D90 in a range from about 250 □μm to about 350 μm. The first glass powder filler material comprises between 20 wt. % and 60 wt. % of the total weight of the inorganic solid components of the cement composition. The second glass powder filler material comprises between 10 wt. % and 40 wt. % of the total weight of the inorganic solid components of the cement composition. A ratio of the second glass powder filler material to the first glass powder filler material is preferably in a range from about 1:4 to about 1:1.

In certain embodiments, the calcined cement skin of the ceramic structure exhibited no visible cracks under 10× magnification after heating to a temperature of 600° C. for 30 minutes followed by unforced cooling to 23° C. That is, the ceramic structure was heated in a furnace to a temperature of 600° C., maintained at 600° C. for 30 minutes, and then removed from the furnace into an ambient atmosphere at approximately 23° C. and allowed to cool without forced cooling (blowing chilled air, etc.). In certain other embodiments, the calcined cement skin of the ceramic structure exhibited no visible cracks under 1 Ox magnification after heating to a temperature of 1000° C. for 30 minutes followed by unforced cooling to 23° C.

In another embodiment, a method of making a honeycomb structure is described comprising extruding a honeycomb body, the honeycomb body comprising a plurality of cells extending axially between first and second opposing end faces of the honeycomb body, the cells comprising intersecting porous walls, shaping the honeycomb body, thereby exposing portions of the porous walls around a periphery of the honeycomb body, coating the periphery of the shaped honeycomb body with a cement mixture, the cement mixture comprising a first glass powder filler material having a first particle size distribution with a D50 in a range from about 10 μm to about 50 μm, and a second glass powder filler material having a second particle size distribution with a D50 in a range from about 150 to about 300 μm, thereby forming a honeycomb structure and drying the cement mixture. Preferably, a coefficient of thermal expansion of the cement mixture after drying is less than $15 \times 10^{-7}/°C$.

The first and second glass powder filler materials may be, for example, fused silica. The first particle size distribution preferably has a D10 in a range from about 1 μm to about 10 μm and a D90 in a range from about 25 μm to about 125 μm. The second particle size distribution has a D10 in a range from about 100 μm to about 150 μm, and a D90 in a range from about 250 □μm to about 350 μm. The first glass powder filler material preferably comprises a range from about 20 wt. % to about 60 wt. % of the total weight of the inorganic solid components of the cement composition. The second glass powder filler material preferably comprises a range from about 10 wt. % to about 40 wt. % of the total weight of the inorganic solid components of the cement composition.

The cement mixture is typically dried at a temperature less than 1000° C. The cement mixture may further comprise ceramic reinforcing fibers. A modulus of rupture of the cement mixture after drying is preferably in a range from about 20 kg/cm² to about 60 kg/cm².

In still another embodiment a cement mixture for application to a ceramic honeycomb body is disclosed comprising a first glass powder filler material having a first particle size distribution with a D50 in a range from about 10 μm to about 50 μm, a second glass powder filler material having a second particle size distribution with a D50 in a range from about 150 μm to about 300 μm, and an inorganic binder material. The first and second glass powder filler materials may be, for example, fused silica. The first particle size distribution has a D10 in a range from about 1 μm to about 10 μm and a D90 in a range from about 25 μm to about 125 μm. The second particle size distribution has a D10 in a range from about 100 μm to about 150 μm, and a D90 in a range from about 250 □μm to about 350 μm. A ratio of the second glass powder filler material to the first glass powder filler material is in a range from about 1:4 to about 1:1. The inorganic binder material preferably comprises colloidal silica or colloidal alumina. A particle size distribution of inorganic particulate materials having a diameter equal to or greater than 1 μm may be bimodal for example.

The first glass powder filler material comprises between 30 wt. % and 40 wt. % of the total weight of the inorganic components of the cement mixture. For example, the first glass powder filler material may comprise between 25 wt. % and 50 wt. % of the total weight of the inorganic solid components of the cement composition, between 30 wt. % and 50 wt. % of the total weight of the inorganic solid components of the cement composition, between 30 wt. % and 50 wt. % of the total weight of the inorganic solid components of the cement composition, between 30 wt. % and 45 wt. % of the total weight of the inorganic solid components of the cement composition, between 30 wt. % and 40 wt. % of the total weight of the inorganic solid components of the cement composition or between 30 wt. % and 35 wt. % of the total weight of the inorganic solid components of the cement composition.

The second glass powder filler material preferably comprises between 15 wt. % and 25 wt. % of the total weight of the inorganic components of the cement mixture. The second glass powder filler material preferably comprises between 10 wt. % and 35 wt. % of the total weight of the inorganic solid components of the cement composition. For example, the second glass powder filler material may comprise between 15 wt. % and 35 wt. % of the total weight of the inorganic solid components of the cement composition, between 20 wt. % and 35 wt. % of the total weight of the inorganic solid components of the cement composition, between 25 wt. % and 35 wt. % of the total weight of the inorganic solid components of the cement composition or between 30 wt. % and 35 wt. % of the total weight of the inorganic solid components of the cement composition.

In some embodiments the cement mixture may further comprise a fibrous ceramic reinforcing material. The fibrous reinforcing material preferably comprises in a range from about 35 wt. % to about 45 wt. % of the total weight of the inorganic solid components of the cement composition or in a range from about 35 wt. % to about 40 wt. % of the total weight of the inorganic solid components of the cement composition.

A solid portion of the inorganic binder material comprises from about 0 wt. % to about 15% wt. % of the total weight of the inorganic solid components of the cement composition and preferably in a range from about 2 wt. % to about 4 wt. %.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention, and together with the description serve to explain the principles and operations of the invention.

DETAILED DESCRIPTION

Figure 1:
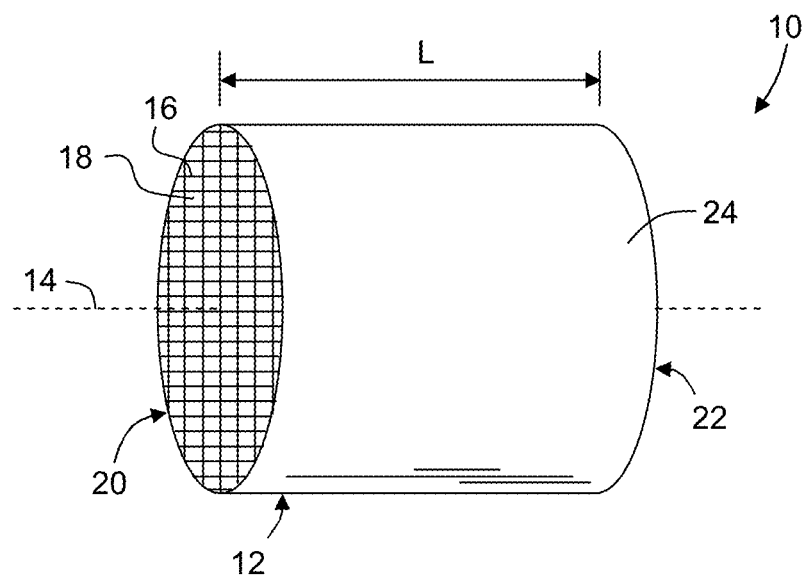
FIG. 1 is a perspective view of a honeycomb structure according to an embodiment of the present invention.

Reference will now be made in detail to embodiments of the invention, examples of which are illustrated in the accompanying drawings. Whenever possible, the same reference numeral will be used throughout the drawings to refer to the same or like parts.

As used herein, a green material is an unfired material comprising a mixture of inorganic and/or organic materials. The green material may include various inorganic filler materials, inorganic and/or organic binder materials, and liquid vehicle. The green material may be dried to remove fluid content (e.g. water). Drying is often accomplished by allowing a part to sit exposed to the ambient atmosphere overnight, however, hot air, forced air, microwave or infrared radiation may be used to augment drying.

As used herein, calcination refers to heating of a green material to a temperature less than 1000° C. for a period sufficient to burn out organic materials contained within the material, for example, 600° C. for about 3 hours.

As used herein, a "super addition" refers to a weight percent of a component, such as, for example, an organic binder, liquid vehicle, additive or pore former, based upon and relative to 100 weight percent of the inorganic components of the mixture.

Figure 2:
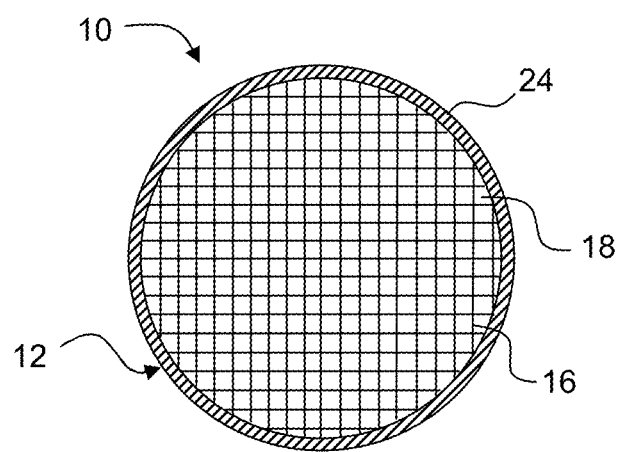
FIG. 2 is an end view of the honeycomb body of FIG. 1.

Shown in FIGS. 1 and 2 is an exemplary honeycomb structure 10 according to one embodiment comprising honeycomb body 12. Honeycomb body 12 has a longitudinal axis 14 and a length L, and comprises a plurality of intersecting porous walls 16 that form mutually adjoining cells or channels 18 extending axially between opposing end faces 20, 22. Cell density can be between 100 and 900 cells per square inch. Typical cell wall thicknesses can range from about 0.025 mm to about 1.5 mm. As used herein, the term "honeycomb" is intended to include a generally honeycomb structure but is not strictly limited to a square structure. For example, hexagonal, octagonal, triangular, rectangular or any other suitable shape may be used. Typical pore sizes contained within the porous walls can be from 0.1 μm to about 100 μm, with cell wall porosity between about 15% and 75%, preferably between about 25% and 50%.

Honeycomb body 12 may be formed from a ceramic material, such as cordierite ($2MgO-2Al_2O_3-5SiO_2$). However, limited substitution of other constituents such as Fe (iron), Co (cobalt), Ni (nickel) and Mn (manganese) for Mg (magnesium), Ga (gallium) for Al (aluminum) and Ge (germanium) for silicon is acceptable. Also, the cordierite phase may include alkali metals, alkaline earth metals or rare earth metals. Honeycomb body 12 may in certain cases be made of other ceramic materials, such as silicon carbide, aluminate titanate gamma alumina and/or mullite, or combinations thereof.

The honeycomb body can be formed according to any conventional process suitable for forming honeycomb monolithic bodies. For example, a plasticized ceramic forming batch composition can be shaped into a green body by any known conventional ceramic forming process, such as extrusion, injection molding, slip casting, centrifugal casting, pressure casting, dry pressing and the like. Typically, honeycomb structures are formed by an extrusion process where a ceramic material is extruded into a green form before the green form is fired to form the final ceramic structure. In an exemplary embodiment, the extrusion can be performed using a hydraulic ram extrusion press, a two stage de-airing single auger extruder or a twin screw mixer with a die assembly attached to the discharge end. The extruded material can be cut to create honeycomb structures such as filter bodies shaped and sized to meet the needs of engine manufacturers. These extruded green bodies can be any size or shape.

Generally, as a ceramic honeycomb structure is extruded, a solid external surface is provided along the length of the structure. Under certain circumstances, however, it may become necessary to remove the external surface. For example, a green extruded honeycomb structure may be shaped to a desired shape and size by removing the extruded external surface. Alternatively, the green honeycomb structure may be fired and then ground to the desired shape and size by removing the external extruded surface and any portion of the porous wall structure necessary to attain the desired shape and size. Shaping can be accomplished by any means known in the art, including cutting, sanding or grinding away the outer extruded surface of the honeycomb structure to achieve the desired shape and size. Once the desired shape and size has been attained, a cement material can be applied to an outer periphery of the sized body to form a new external surface, or skin, on the body. Typically, the ends of the honeycomb body are not covered with the cement, although certain passages may be plugged if desired. Once the cement composition has been applied to the honeycomb structure, the cement composition can be dried and/or calcined. In some embodiments, the honeycomb body over which the cement is applied comprises fired ceramic material. In other embodiments, the honeycomb body comprises a green body or a calcined body. In some cases, final firing of the calcined honeycomb structure can take place during the catalyzation process.

Various methods may be employed to apply a layer of cement to honeycomb body 12. For example, a dispensing device (not shown) can be used to apply an appropriate amount of cement mixture to the external surface of the honeycomb body 12. Methods of applying a skin material (e.g. cement) are well known in the art and not discussed further herein. For example, U.S. patent application Ser. No. 12/231,140, the content of which is incorporated herein by reference in its entirety, describes various methods of applying a cement skin to a honeycomb body.

Accordingly, honeycomb structure 10 further comprises outer wall 24 deposited over peripheral surfaces of honeycomb body 12. Outer wall 24 (hereinafter skin 24) is a cement comprising a glass powder as a low thermal expansion filler material, a binder and a solvent or vehicle for carrying the solid constituents of the glass-based cement. Preferably, the glass of the glass powder filler material is an amorphous fused silica ($SiO_2$). The glass powder filler material can have a median particle size (D50) between 10 and 20 μm, with a minimum particle size between 7 μm and 75 μm and a maximum particle size between 50 μm and 70 μm. Particle size was determined as a mass-based equivalent spherical diameter. The glass powder filler material may comprise, for example, from 60-80 wt. % of the total inorganic components of the cement. Suitable silica powder filler materials are available, for example, under the trade name Teco-Sil, available from CE Minerals of Tennessee Electro Minerals Incorporated, Tenn., USA. All particle size measurements herein were made with a Microtrac Inc. particle size analyzer, unless otherwise indicated.

In another embodiment, skin 24 of honeycomb structure 10 comprises an amorphous glass-based cement, the cement formed from a composition comprising a first (fine) glass powder as a low thermal expansion filler material, a second (coarse) glass powder as a low thermal expansion filler material, a binder and a solvent or vehicle for carrying the solid constituents of the glass-based cement. Preferably, the glasses of both the first glass powder filler material and the second glass powder filler material are amorphous fused silica having particle sizes greater than about 1 µm. The distribution of glass powder filler material particle size is preferably multimodal in that a distribution of the glass powder filler material with particle sizes greater than about 1 µm exhibits multiple modes (local maximums) of particle sizes. In one embodiment, the amorphous glass-based cement comprises a bimodal particle size distribution of amorphous glass particles with a particle size greater than about 1 µm. The glass based cement may include a first glass powder filler material wherein a median (D50) particle size of the first glass powder filler material is preferably in a range from about 10 to about 50 µm, from about 15 µm to about 50 µm, from about 20 µm to about 45 µm or from about 30 µm to about 45 µm, with a D10 in a range from about 1 µm to about 10 µm and D90 in a range from about 25 µm to about 125 µm. A median (D50) particle size of the second glass powder filler material is preferably in a range from about 150 µm to about 300 µm, in a range from about 150 µm to about 250 µm, in a range from about 170 to about 230, in a range from about 180 to about 220, with D10 in a range from about 100 µm to about 150 µm, and D90 in a range from about 250 µm to about 350 µm. Particle sizes are determined as a mass-based equivalent spherical diameter. As used herein, the term D50 represents the median of the distribution of particle sizes, D10 represents the particle size in microns for which 10% of the distribution are smaller than the particle size, and D90 represents the particle size in microns for which 90% of the distribution are smaller than the particle size. The glass based cement may contain, for example, an amount of the first glass powder filler material in a range from about 20 to about 60 wt. % of the total weight of the inorganic solid components of the cement, in a range from about 25 wt. % to about 50 wt. %, in a range from about 25 wt. % to about 40 wt. %, or in a range from about 25 wt. % to about 35 wt. %. The glass based cement may contain, for example, an amount of the second glass powder filler material in a range from about 10 wt. % to about 40 wt. % of the total weight of the inorganic solid components of the cement, in a range from about 15 wt. % to about 40 wt. %, in a range from about 20 wt. % to about 35 wt. %.

In one embodiment, D50 of the first glass powder filler material may be in a range from about 34 µm to about 40 µm, and a median particle size of the second glass powder filler material is in a range from about 190 µm to about 280 µm. In one example, the first glass powder filler material has a D10 of about 6.0 µm, a D50 of about 34.9 µm and a D90 of about 99 µm. In another example, the first glass powder filler material has a D10 of about 6.7 µm, a D50 of about 39.8 µm, and a D90 of about 110.9 µm. In still another example, the first glass powder has a D10 of about 2.7 µm, a D50 of about 13.8 µm and a D90 of about 37.8 µm, and is yet another example, the first glass powder filler material has a D10 of about 2.8 µm, a D50 of about 17.2 µm and a D90 of about 47.9 µm.

The ratio of the second glass powder filler material to the first glass powder filler material may be in a range from about 1:4 to about 1:1, such as about 1:3.5 to about 1:1, from about 1:3 to about 1:1, from about 1:2.5 to about 1:1, from about 1:2 to about 1:1 or from about 1:1.5 to about 1:1. In a preferred embodiment, the ratio of the second glass powder filler material to the first glass powder filler material is 1:1.

To provide the cement compositions of the present disclosure, the inorganic powders comprising any of the above inorganic powders and any optional inorganic additive components can be mixed together with a suitable organic and/or inorganic binder material. The organic binder material may comprise one or more organic materials, such as a cellulose ether, methylcellulose, ethylcellulose, polyvinyl alcohol, polyethylene oxide and the like, or in some embodiments a gum-like material such as Actigum®, xanthan gum or latex. For example, A4 Methocel is a suitable organic binder. Methocel A4 is a water-soluble methyl cellulose polymer binder available from Dow Chemical. A suitable inorganic binder may comprise colloidal silica or alumina comprising nanometer-scale silica or alumina particles suspended in a suitable liquid, such as water. The inorganic binder material is preferably present in the cement composition in an amount less than about 10% of the total weight of inorganic solids present in the cement, and in some embodiments inorganic binders are present in an amount equal to or less than about 5 wt. %, and in certain other embodiments in a range from about 2 wt. % to about 4 wt. % taking into account the fluid portion of the organic binder (wherein the weight contribution of the fluid portion is removed). A suitable colloidal silica binder material is Ludox HS40 produced by W. R. Grace. Typical colloidal binder materials may comprise approximately 40% by weight solid material as a suspension in a deionized water vehicle.

In some embodiments, the cements described supra may also include an inorganic fibrous reinforcing material. For example, aluminosilicate fibers may be added to the cement mixture to strengthen the honeycomb structure after application of the skin. For example, the cement may include an inorganic fibrous material from about 25 to about 50 wt. % of the total weight of the inorganic solid components of the cement, from about 30 to about 50 wt. %, and in some embodiments from about 35 to about 45 wt. % of the total weight of the inorganic solid components of the cement. In certain other embodiments, fibrous inorganic reinforcing materials may be present in an amount from about 36 wt. % to about 43 wt. % as a percentage of the total weight of the inorganic solids of the cement composition. A suitable inorganic fibrous reinforcing material is Fiberfrax QF 180, available from Unifrax, however, any high aspect ratio refractory particulate could be used.

Typically, the preferred liquid vehicle or solvent for providing a flowable or paste-like consistency has included water, such as deionized (DI) water, although other materials may be used. The liquid vehicle content may be present as a super addition in an amount equal to or less than about 30 wt. % of the inorganic components of the cement mixture, preferably in a range from about 10 wt. % to about 25 wt. % of the inorganic components of the cement mixture. However, the liquid vehicle is typically adjusted to obtain a viscosity suitable to make the cement easy to apply.

In some embodiments the cement may optionally further contain organic modifiers, such as adhesion promoters for enhancing adhesion between the cement and the honeycomb body. For example, Michem 4983 has been found suitable for this purpose.

Shown in Table 1 below are two examples of different cement mixtures according to embodiments described herein, each cement mixture containing an amorphous fused silica filler material with a particle size greater than 1 µm, where the wt. % for the first silica powder filler material and the inorganic fibrous material are expressed as a % of the total inorganic components of the cement.

TABLE 1

| | wt. % | A | B |
|---|---|---|---|
| 1st silica powder filler | 71.43 | −200 silica | −325 silica |
| Organic binder | 0.71 | A4 Methocel | A4 Methocel |
| Fibrous reinforcer | 28.57 | QF 180 | QF 180 |
| Organic modifier | 2.14 | Michem 4983R | Michem 4983R |
| Vehicle | 20.59 | DI water | DI water |

Table 2 lists three examples of a glass-based cement mixture according to embodiments described herein comprising a multimodal distribution of fused silica particles, where the percentage by weight for the first and second silica powder filler material, the colloidal silica and the inorganic fibrous material are expressed as a % of the total inorganic components of the cement.

TABLE 2

| Constituent | wt. % C | D | E |
|---|---|---|---|
| 1st silica powder filler | 35.81 −325 silica | 44i silica | −200 silica |
| 2nd silica powder filler | 19.42 −50 + 100 silica | −50 + 100 silica | −50 + 100 silica |
| Organic binder | 0.59 A4 Methocel | A4 Methocel | A4 Methocel |
| Colloidal silica | 6.77 Ludox HS40 | Ludox HS40 | Ludox HS40 |
| Fibrous filler | 38.00 QF 180 | QF 180 | QF 180 |
| Vehicle | 11.39 DI water | DI water | DI water |

Figure 3:
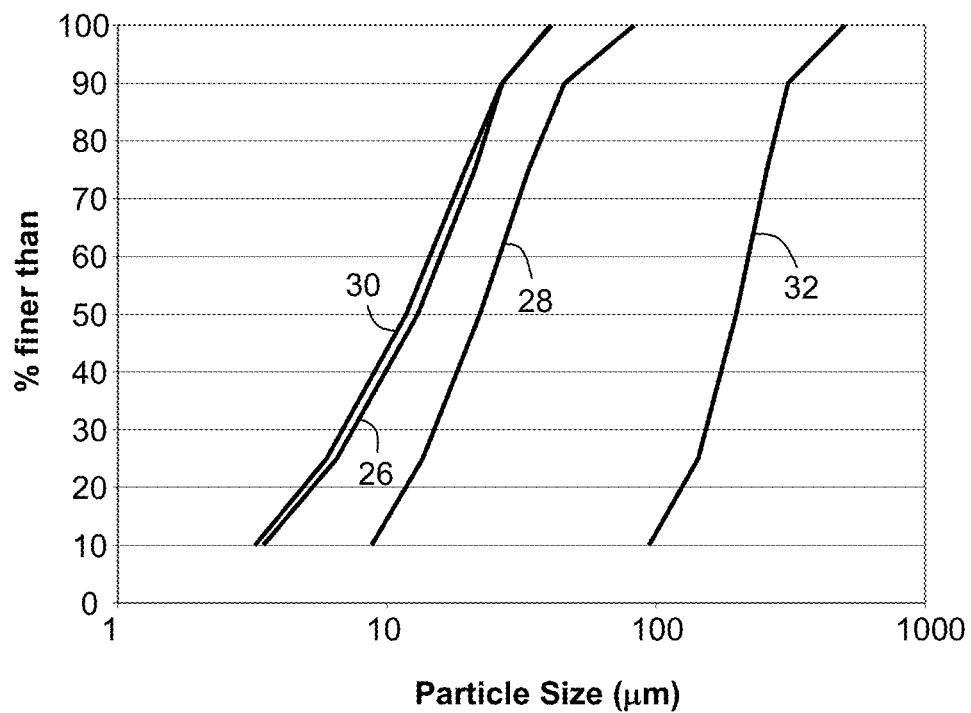
FIG. 3 is a graph illustrating examples glass powder filler material particle size distributions according to embodiments of the present invention.

Particle size distributions for examples C, D and E are shown in FIG. 3, where curve 26 represents a particle size distribution for a first glass powder (e.g. −325 Teco-Sil), curve 28 represents a particle size distribution for another glass powder (e.g. −200 Teco-Sil), curve 30 represents a particle size distribution for still another glass powder (e.g. 44i Teco-Sil) and curve 32 represents a particle size distribution for another glass powder (e.g. −50+100 Teco-Sil).

Figure 4:
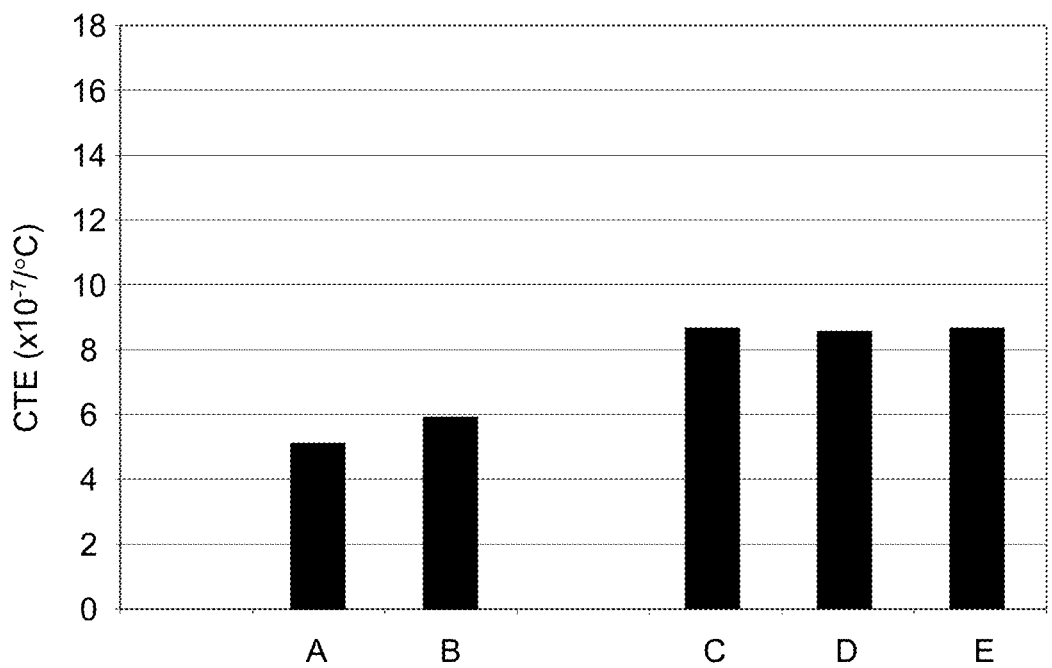
FIG. 4 is a graph illustrating coefficients of thermal expansion, with error bars, of example cements according to embodiments of the present invention.

In accordance with embodiments disclosed herein, the average coefficient of thermal expansion (CTE) of the calcined cement from 600° C. on cooling to room temperature is equal to or less than about $15 \times 10^{-7}$/° C., preferably equal to or less than about $12 \times 10^{-7}$/° C., preferably equal to or less than about $10 \times 10^{-7}$/° C., preferably equal to or less than about $8 \times 10^{-7}$/° C. As used herein room temperature means 23° C. Preferably, a coefficient of thermal expansion of the calcined cement mixture is equal to a thermal expansion coefficient of the honeycomb body. In certain embodiments CTE can be in a range from about $7 \times 10^{-7}$/° C. to about $10 \times 10^{-7}$/° C. For example, FIG. 4 graphically illustrates the average CTE from 600° C. on cooling to room temperature for examples A-E described above. Error bars are included to the right of each data set. As indicated, Sample A had an average CTE of approximately $5.1 \times 10^{-7}$/° C., Sample B had an average CTE of about $5.9 \times 10^{-7}$/° C., Sample C had an average CTE of about $8.6 \times 10^{-7}$/° C., Sample D had an average CTE of about $8.5 \times 10^{-7}$/° and Sample E had an average CTE of about $8.6 \times 10^{-7}$/° C. CTE determinations were made by measuring the dimensions of a cement sample at room temperature, then heating the sample to a temperature of 600° C. After the sample equilibrated at 600° C., the sample was allowed to cool back to room temperature while dimensional measurements were made at a frequency of approximately one per minute. Average CTE was determined from the data assuming a linear expansion curve.

In accordance with embodiments disclosed herein, the modulus of rupture (MOR) of uncalcined cement is in a range from about 20 kg/cm² to about 60 kg/cm², preferably in a range from about 20 kg/cm² to about 50 kg/cm², preferably in a range from about 20 kg/cm² to about 40 kg/cm², preferably in a range from about 20 kg/cm² to about 35 kg/cm². Modulus of rupture of uncalcined cement in some embodiments is between 22 kg/cm² and 35 kg/cm². In certain embodiments, the uncalcined MOR is in a range from about 24 kg/cm² to about 30 kg/cm².

In accordance with embodiments disclosed herein, the modulus of rupture (MOR) of calcined cement is in a range from about 14 kg/cm² to about 45 kg/cm², preferably in a range from about 14 kg/cm² to about 40 kg/cm², preferably in a range from about 14 kg/cm² to about 35 kg/cm², preferably in a range from about 14 kg/cm² to about 30 kg/cm². Modulus of rupture of calcined cement in some embodiments is between 14 kg/cm² and 25 kg/cm². In certain embodiments, the calcined MOR is in a range from about 14 kg/cm² to about 20 kg/cm².

Figure 5:
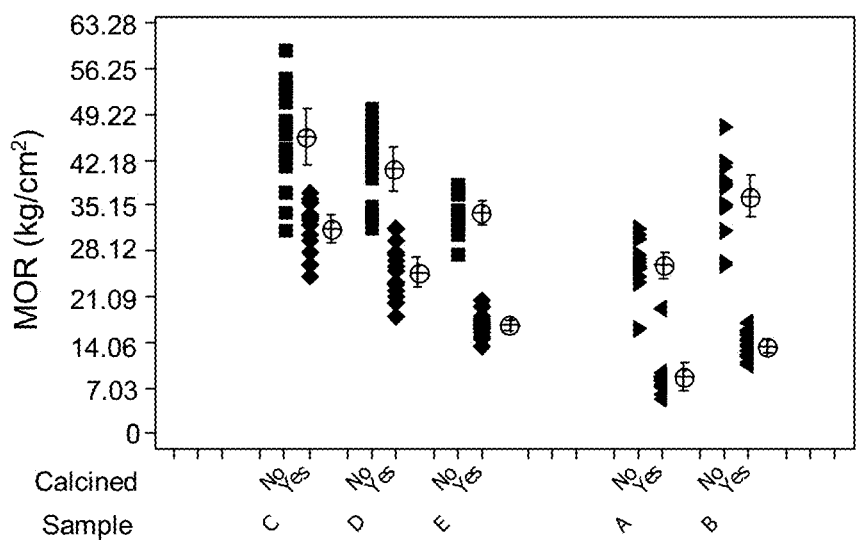
FIG. 5 is a graph illustrating modulus of rupture for example cements according to embodiment of the present invention.

Modulus of rupture was determined for cast (uncalcined) and calcined sheets in four point flexure according to ASTM C158, Standard Test Methods for Strength of Glass by Flexure (Determination of Modulus of Rupture). FIG. 5 depicts the measured modulus of rupture for Samples A-E, both calcined and uncalcined (green). All calcining of those samples, and other samples described herein, was conducted in a box furnace with a linear ramp to 600° C. in 3 hours, followed by a hold for 3 hours at 600° C., then followed by a ramp down to room temperature over a time period of 3 hours. In commercial use the ceramic article would be wash coated with catalyst followed by a heat treatment to remove organic materials. The ceramic article would also be canned with a mat material that may also require heat treatment to remove organic materials. The calcining process simulates service conditions experienced by the ceramic article. Measurements of strength via modulus of rupture testing showed only a small decrease in retained strength after calcination for the fused silica samples. The high retained strength after calcination is advantageous for handling in the supply chain after the organic components have been removed.

Porosity of the calcined cement skin is in a range from about 30% to about 60%, preferably in a range from about 35% to about 60%, and preferably in a range from about 35% to about 50%. In some embodiments, porosity can be in a range from about 35% to about 48%. Porosity was measured using mercury intrusion porosimetry on cast sheets that are calcined to 600° C. for 3 hours as described herein to remove organic materials from the cement composition, where pore radius is inversely proportional to the hydraulic pressure required to force mercury into the sample according to:

$$P = -2\gamma \cos \theta/(r),$$

where P is the applied pressure, γ is the surface tension of mercury, θ is the contact angle of mercury and r is the pore radius.

Cement compositions described herein can exhibit viscosities well suited for forming an external skin over a honeycomb body. For example, compositions according to the embodiments herein can have an infinite shear viscosity equal to or less than about 12 Pascal-seconds (Pa·s.), equal to or less than about 5 Pa·s., or equal to or less than about 4 Pa·s. For a shear rate of 10 s⁻¹, the shear viscosity is preferably equal to or less than about 400 Pa·s, equal to or less than about 350 Pa·s or less than or equal to about 300 Pa·s. Viscosity was measured using a parallel plate viscometer.

Calcined cement compositions described herein can exhibit an elastic modulus equal to or less than about $1 \times 10^6$, equal to or less than about 7×10⁵ Pa, equal to or less than about 5×10⁵ Pa or equal to or less than about 4×10⁵ Pa. In certain embodiments the elastic modulus is in a range from about 2×10⁵ Pa to about 6×10⁵ Pa.

Thermal shock testing was performed on samples 1-24 to determine the ability of a skinned ceramic body to survive rapid temperature excursions. First, an oven is preheated to a first temperature and stabilized. Then, a room temperature article (i.e. 23° C.), such as a honeycomb body comprising a ceramic skin, such as embodiments thereof described herein, is plunged into the hot oven for 30 minutes. After the 30 minute period, the hot article is removed from the oven and air quenched back to room temperature without forced cooling (e.g. blowing chilled air, etc.). The article is transferred from the hot and cold locations on low thermal mass ceramic setters (1" cubes of cordierite cellular ceramic). The article is inspected for cracks in the skin and honeycomb body using non-destructive methods including visual inspection (aided with 10× magnification), transmitted light and ultrasound pulse-echo. The article is deemed to have failed when a crack is detected in the honeycomb body or cement skin. When an article survives, the oven is set to a higher temperature and the process is repeated. The last temperature passed and 1$^{st}$ temperature failed bracket the performance of the article. In the case of the data presented herein, the 1$^{st}$ temperature is 500° C. and each successive step is an addition of 50° C. The last temperature survived is reported. No temperatures in excess of 1100° C. were tested.

Accordingly, in certain embodiments, the calcined cement skin of the ceramic structure exhibited no visible cracks under 10× magnification after heating to a temperature of 600° C. for 30 minutes followed by unforced cooling to 23° C. In certain other embodiments, the calcined cement skin of the ceramic structure exhibited no visible cracks under 10× magnification after heating to a temperature of 1000° C. for 30 minutes followed by unforced cooling to 23° C.

In one particular example, a series of cements were made having the compositions described in Tables 3A-3C below.

TABLE 3A

| Constituent | Samples 1 | 2 | 3 | 4 Weight (grams) | 5 | 6 | 7 | 8 |
|---|---|---|---|---|---|---|---|---|
| CE Minerals −50/+100 −60M, sieved to −60 mesh | | 525 | | | | 300 | 300 | 300 |
| 80 × 105 | 300 | | 300 | 525 | 750 | | | 1200 |
| −200 F. | 1200 | 975 | 1200 | 975 | | | | |
| −325 F. | | | | | 750 | 1200 | 1200 | |
| Methylcellulose (A4M) | 16.5 | 16.5 | 16.5 | 16.5 | 16.5 | 16.5 | 16.5 | 16.5 |
| Colloidal silica (Ludox HS-40) | 168 | 198 | 168 | 198 | 168 | 168 | 228 | 168 |
| Fiberfrax (QF-80) | 1191 | 1036 | 880.5 | 1036 | 1191 | 1191 | 880.5 | 880.5 |
| DI Water | 332 | 357 | 348 | 323 | 309 | 279 | 252 | 360 |

TABLE 3B

| Constituent | Samples 9 | 10 | 11 | 12 Weight (grams) | 13 | 14 | 15 | 16 |
|---|---|---|---|---|---|---|---|---|
| CE Minerals −50/+100 −60M, sieved to −60 mesh | | 300 | 525 | | | 525 | 750 | |
| 80 × 105 | 750 | | | 300 | 750 | | | 750 |
| −200 F. | 750 | 1200 | 975 | 1200 | | | | 750 |
| −325 F. | | | | | 750 | 975 | 750 | |
| Methylcellulose (A4M) | 16.5 | 16.5 | 16.5 | 16.5 | 16.5 | 16.5 | 16.5 | 16.5 |
| Colloidal silica (Ludox HS-40) | 228 | 228 | 198 | 228 | 228 | 198 | 168 | 168 |
| Fiberfrax (QF-80) | 1191 | 1191 | 1036 | 880.5 | 880.5 | 1036 | 880.5 | 880.5 |
| DI Water | 301 | 320 | 310 | 332 | 221 | 229 | 240 | 292 |

TABLE 3C

| Constituent | Samples 17 | 18 | 19 | 20 Weight (grams) | 21 | 22 | 23 | 24 |
|---|---|---|---|---|---|---|---|---|
| CE Minerals −50/+100 −60M, sieved to −60 mesh | | 750 | | | 525 | 750 | | 750 |
| 80 × 105 | 525 | | 300 | 525 | | | 525 | |
| −200 F. | 975 | 750 | | | | 750 | | |
| −325 F. | | | 1200 | 975 | 975 | | 975 | 750 |

TABLE 3C-continued

| Constituent | Samples | | | | | | | |
|---|---|---|---|---|---|---|---|---|
| | 17 | 18 | 19 | 20 | 21 | 22 | 23 | 24 |
| | | | | Weight (grams) | | | | |
| Methylcellulose (A4M) | 16.5 | 16.5 | 16.5 | 16.5 | 16.5 | 16.5 | 16.5 | 16.5 |
| Colloidal silica (Ludox HS-40) | 198 | 168 | 228 | 198 | 198 | 228 | 198 | 228 |
| Fiberfrax (QF-80) | 880.5 | 1191 | 1191 | 1036 | 1036 | 880.5 | 1036 | 1191 |
| DI Water | 302 | 262 | 259 | 222 | 264 | 238 | 251 | 254 |

Each of the samples described in Tables 3A-3C were then evaluated for their modulus of rupture (both uncalcined and calcined), their calcined porosity and cracking after thermal shock. The results of that evaluation are presented below in Tables 4A-4C.

TABLE 4A

| Property | Sample | | | | | | | |
|---|---|---|---|---|---|---|---|---|
| | 1 | 2 | 3 | 4 | 5 | 6 | 7 | 8 |
| Uncalcined MOR (mean), kg/cm$^2$ | 27.68 | 27.22 | 56.13 | 25.02 | 33.88 | 44.08 | 50.09 | 29.20 |
| Calcined MOR (mean), kg/cm$^2$ | 28.15 | * | * | 16.16 | 25.51 | 42.77 | 44.63 | 23.25 |
| Median Calcined pore size, μm | 2.99 | 3.55 | 1.69 | 3.76 | 2.13 | 1.41 | 1.21 | 3.31 |
| Calcined porosity, % | 41.1 | 40.5 | 40.2 | 42.9 | 39.2 | 38.1 | 38.1 | 44.5 |
| Average Thermal Shock Final Pass Temp. (° C.) | 675 | 1050 | 650 | 1025 | 775 | 600 | 625 | 1050 |

* insufficient number of cast sheets available

TABLE 4B

| Property | Sample | | | | | | | |
|---|---|---|---|---|---|---|---|---|
| | 9 | 10 | 11 | 12 | 13 | 14 | 15 | 16 |
| Uncalcined MOR (mean), kg/cm$^2$ | 22.43 | 26.50 | 25.54 | 37.80 | 35.06 | 46.20 | 38.26 | 24.70 |
| Calcined MOR (mean), kg/cm$^2$ | * | 21.48 | 16.83 | 23.20 | 26.37 | * | 30.27 | 16.33 |
| Median Calcined pore size, μm | 4.47 | 3.36 | 4.24 | 3.55 | 2.04 | 1.83 | 1.70 | 5.38 |
| Calcined porosity, % | 44.6 | 43.7 | 45.3 | 45.9 | 41.4 | 36.9 | 39.8 | 46.2 |
| Average Thermal Shock Final Pass Temp. (° C.) | 975 | 775 | 925 | 925 | 900 | 750 | 725 | 1100 |

* insufficient number of cast sheets available

TABLE 4C

| Property | Sample | | | | | | | |
|---|---|---|---|---|---|---|---|---|
| | 17 | 18 | 19 | 20 | 21 | 22 | 23 | 24 |
| Uncalcined MOR (mean), kg/cm$^2$ | 25.26 | 24.71 | 51.04 | 48.67 | 41.64 | 23.12 | 43.88 | 27.98 |
| Calcined MOR (mean), kg/cm$^2$ | 15.60 | 15.40 | * | 41.30 | 33.99 | 12.22 | 34.68 | 21.13 |
| Median Calcined pore size, μm | 4.52 | 4.06 | 1.54 | 1.60 | 2.14 | 5.35 | 2.09 | 2.74 |
| Calcined porosity, % | 46.1 | 43.0 | 37.6 | 37.9 | 38.4 | 45.5 | 40.9 | 38.8 |
| Average Thermal Shock Final Pass Temp. (° C.) | 850 | 1075 | 650 | 675 | 825 | 1100 | 825 | 675 |

* insufficient number of cast sheets available

The kinetics of amorphous to crystalline silica phase transition have been reported in the literature as a function of temperature, time, and amount of crystalline 'seed' material (see, for example, The Effect of Cristobalite Seed on the Crystallization of Fused Silica Based Ceramic Core—A Kinetic Study, Ling-Yi Wang and Min-Hsiung Hon, Ceramics International 21 (1995), pp. 187-193., the content of which is included herein in its entirety by reference). The kinetics used to determine the amount of time required to create 2% crystalline silica (cristobalite) at 1100° C. was estimate to be 214 hours at 1100° to create 2 wt. % crystobalite. This time greatly exceeds any anticipated time for a substrate or filter in an after-treatment application such as automotive uses.

Figure 6:
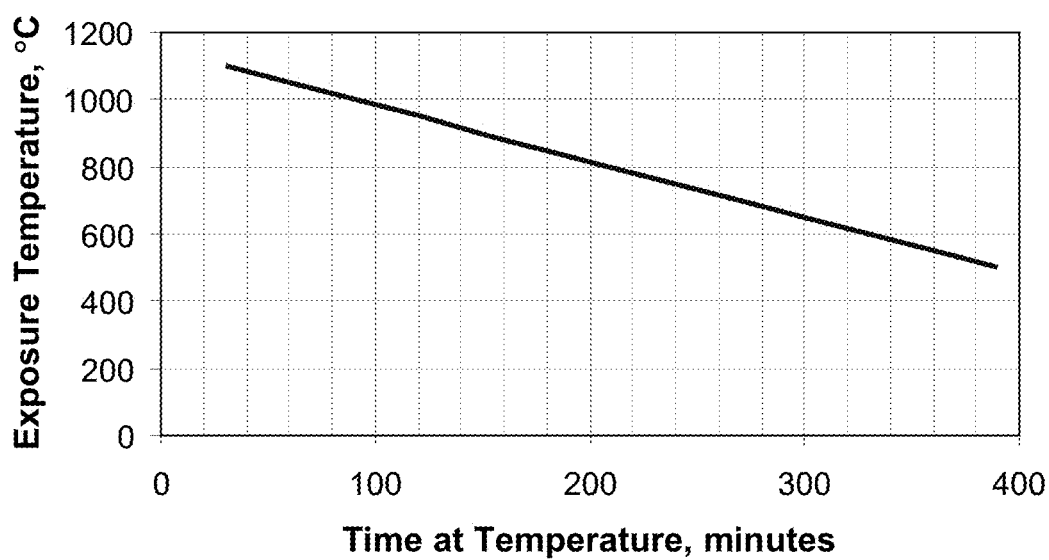
FIG. 6 is a plot of temperature vs. time for exposing skinned structures prior to x-ray diffraction analysis according to embodiments of the present invention.
Figure 7:
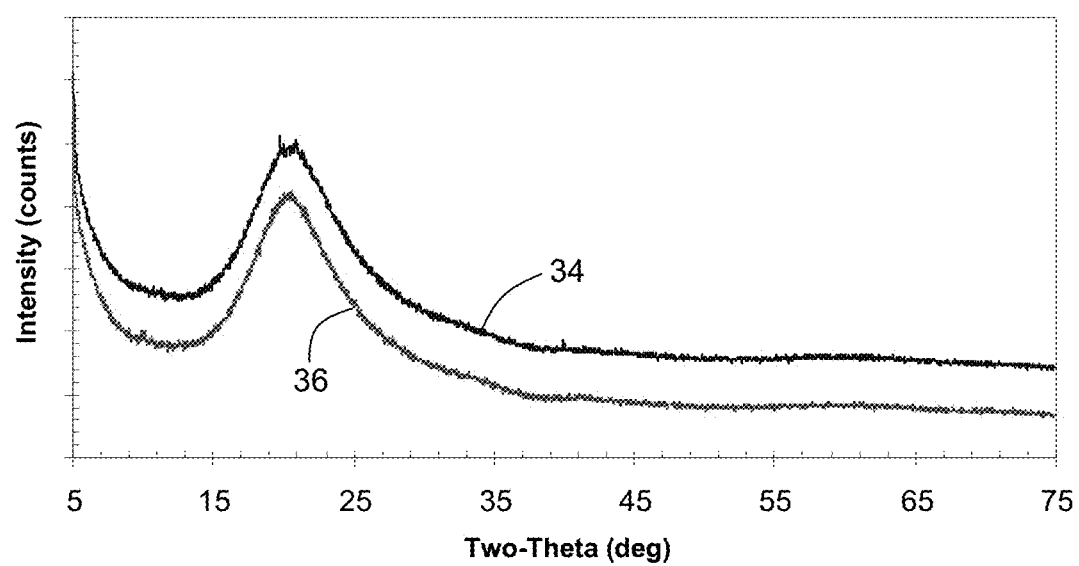
FIG. 7 is a plot of x-ray diffraction results for a first honeycomb structure having an as-applied skin and a honeycomb structure after exposure to the temperature-time schedule of FIG. 6.

FIG. 6 illustrates a temperature cycle applied to samples of honeycomb structures disclosed herein, after which the samples were analyzed by x-ray diffraction. The temperature curve of FIG. 6 indicates temperatures up to 1100° C. for 30 minutes, and a temperature equal to or greater than 1000 C for at least about 1 hour, and at least 6 hours at a temperature equal to or greater than about 500° C. The results of the x-ray diffraction analysis are presented in FIG. 7 plotted against an arbitrary intensity scale. Curve 34 of FIG. 7 depicts the x-ray diffraction result for the skin cement as applied, and curve 36 represents the x-ray diffraction curve for the skin cement after exposure to the temperature cycle of FIG. 6. Neither curve exhibits characteristics of crystalline structure.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

What is claimed is:

1. A honeycomb structure comprising:
a ceramic honeycomb body including a plurality of cells extending axially between first and second opposing end faces of the honeycomb body, the plurality of cells defined by intersecting porous walls; and
a calcined cement layer comprising fused silica having a particle size distribution with a D50 in a range from 150 to 300 µm disposed over a periphery of the honeycomb body, wherein an average coefficient of thermal expansion of the calcined cement layer from a temperature of 600° C. on cooling to 23° C. is equal to or less than $15 \times 10^{-7}/°$ C.

2. The honeycomb structure according to claim 1, wherein the average coefficient of thermal expansion of the calcined cement from a temperature of 600° C. on cooling to 23° C. is in a range from $7 \times 10^{-7}/°$ C. to $10 \times 10^{-7}/°$ C.

3. The honeycomb structure according to claim 1, wherein after heating to a temperature of 600° C. for 30 minutes followed by unforced cooling to 23° C., no cracks are visible in the calcined cement layer under 10× magnification.

4. The honeycomb structure according to claim 1, wherein the calcined cement layer comprises an inorganic fibrous reinforcing material.

5. The honeycomb structure according to claim 1, wherein a modulus of rupture of the calcined cement layer is in a range from 14 kg/cm$^2$ to 45 kg/cm$^2$.

6. The honeycomb structure according to claim 1, wherein a porosity of the calcined cement layer is in a range from 30% to 60%.

7. The honeycomb structure according to claim 1, wherein an elastic modulus of the calcined cement layer is equal to less than $1 \times 10^6$ Pa.

8. A honeycomb structure comprising:
a ceramic honeycomb body including a plurality of cells extending axially between first and second opposing end faces of the honeycomb body, the plurality of cells defined by intersecting porous walls; and
a calcined cement layer comprising fused silica disposed over a periphery of the honeycomb body, wherein an average coefficient of thermal expansion of the calcined cement layer from a temperature of 600° C. on cooling to 23° C. is equal to or less than $15 \times 10^{-7}/°$ C. and wherein the average coefficient of thermal expansion of the calcined cement layer is equal to an average coefficient of thermal expansion of the honeycomb body.

9. The honeycomb structure according to claim 8, wherein the average coefficient of thermal expansion of the calcined cement from a temperature of 600° C. on cooling to 23° C. is in a range from $7 \times 10^{-7}/°$ C. to $10 \times 10^{-7}/°$ C.

10. The honeycomb structure according to claim 8, wherein after heating to a temperature of 600° C. for 30 minutes followed by unforced cooling to 23° C., no cracks are visible in the calcined cement layer under 10× magnification.

11. The honeycomb structure according to claim 8, wherein an elastic modulus of the calcined cement layer is equal to or less than $1 \times 10^6$ Pa.

12. The honeycomb structure according to claim 8, wherein a modulus of rupture of the calcined cement layer is in a range from 14 kg/cm$^2$ to 45 kg/cm$^2$.

* * * * *

UNITED STATES PATENT AND TRADEMARK OFFICE
CERTIFICATE OF CORRECTION

| | | |
|---|---|---|
| PATENT NO. | : 9,556,769 B2 | Page 1 of 1 |
| APPLICATION NO. | : 14/818780 | |
| DATED | : January 31, 2017 | |
| INVENTOR(S) | : Thomas Richard Chapman et al. | |

It is certified that error appears in the above-identified patent and that said Letters Patent is hereby corrected as shown below:

In the Claims

In Column 16, Line 13, Claim 7, after "to" insert -- or --.

Signed and Sealed this
Eighth Day of June, 2021

Drew Hirshfeld
*Performing the Functions and Duties of the*
*Under Secretary of Commerce for Intellectual Property and*
*Director of the United States Patent and Trademark Office*